May 15, 1928.  W. G. KIRCHHOFF  1,669,907

CLUTCH

Filed Feb. 21, 1922

Inventor
WILLIAM G. KIRCHHOFF
By
Walter F. Murray
Attorney

Patented May 15, 1928.

1,669,907

UNITED STATES PATENT OFFICE.

WILLIAM G. KIRCHHOFF, OF CINCINNATI, OHIO, ASSIGNOR TO THE J. H. DAY COMPANY, OF CINCINNATI, OHIO, A CORPORATION OF OHIO.

CLUTCH.

Application filed February 21, 1922. Serial No. 538,310.

An object of my invention is to provide a simple and efficient form of clutch.

Another object of my invention is to provide a clutch mechanism, such that a multiple of clutches may be employed to transmit motion from one shaft to a second shaft, the clutches bearing such relation that they will simultaneously bind and release the second mentioned shaft.

These and other objects are obtained by means described herein and disclosed in the accompanying drawings, in which.

Figure 1:
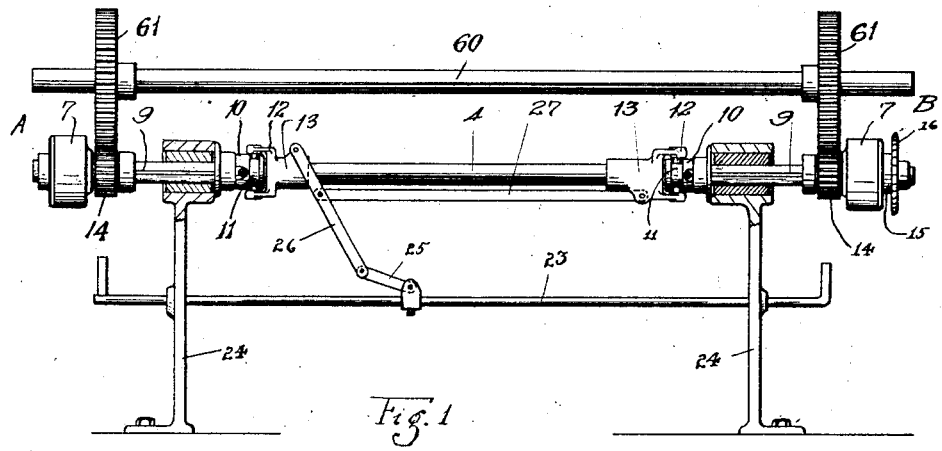
Fig. 1 is a front elevation partly in section, showing the clutch mechanism embodying my invention.
Figure 2:
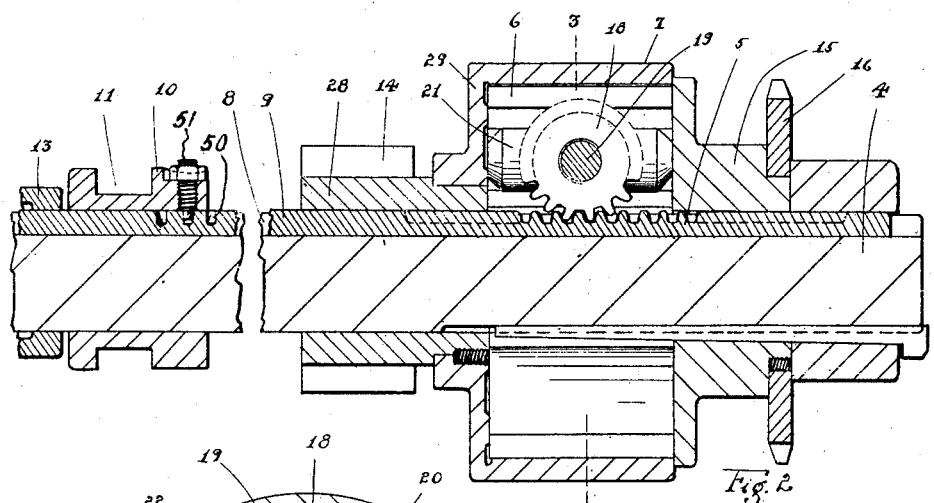
Fig. 2 is an enlarged vertical section taken through one of the clutches shown in Fig. 1.
Figure 3:
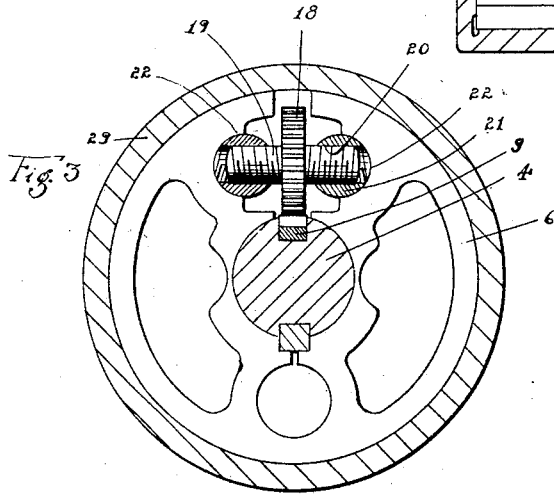
Fig. 3 is a sectional view on line 3—3 of Fig. 2.

The device of this invention is especially adapted for relieving the torque on a loaded driven shaft when said shaft is to be actuated from a power shaft and may be utilized with various mechanisms for example with a dough mixer as shown in my application for patent filed of even date herewith and which matured into Patent No. 1,481,556.

The individual clutch mechanisms comprise a revolubly mounted shaft 4 longitudinally of which may be reciprocated racks 5 engaging an expanding and contracting mechanism mounted upon a clutch shoe 6 adapted to bind upon a drum 7.

The revoluble shaft 4 has formed in it longitudinally extending slots 8 within which are reciprocally mounted bars 9 having formed upon them the racks 5. The bars 9 are attached to collars 10 having grooves 11 formed in them, and into which grooves the arms 12 of forks 13 revolubly extend. The fork is constructed in the nature of a sleeve which is revolubly and reciprocally mounted upon the shaft 4. The forks do not rotate but serve as a means that will permit rotation of the collars 10 and that may be used for reciprocating the collars 10 longitudinally of the shaft 4. Sleeves 28 are revolubly mounted upon the shaft 4, and carry clutch drums 7 and suitable means such as gears 14 whereby motion may be transmitted from the sleeve 28 to any other mechanism to be actuated. A collar 15 is keyed to the shaft 4 and carries a sprocket wheel 16, whereby motion may be transmitted to the shaft 4. A split clutch shoe 6 is keyed to the shaft 4, the clutch shoe being adapted to be expanded and to contract whereby same may bind upon and be released from the drum. This expansion and contraction of the clutch shoe is effected by means of a gear 18 contained within the periphery of the clutch shoe and which carries an axial shaft 19, the opposite ends of which shaft are threaded in opposite directions. The gear 18 engages the rack 5. The threaded ends of the shaft 19 engage in threaded bores 20 in the cylindrical blocks 21, which blocks ride in substantially semi-cylindrical seats 22 formed in opposite portions of the clutch shoe immediately adjacent the split or spaced ends of said shoe. From the foregoing it is apparent that when the rack is reciprocated, the gear 18 and shaft 19 are revolubly actuated, thereby moving the blocks 21 toward and away from the gear 18 with a consequent expanding and contracting of the clutch shoe. The contraction of the shoe may be attained by giving spring qualities to the shoe in any of the manners common in the art.

In Fig. 1 I have shown two clutch mechanisms of the type described, mounted at the opposite ends of the shaft 4. A shift bar 23 is mounted upon the standards or uprights 24 and extends in substantial parallelism with the shaft 4. The shift bar is pivotally connected by means of a link 25 to one end of the lever arm 26, the other end of which lever arm is pivotally mounted upon the fork 13 of the clutch mechanism A. The fork 13 of the clutch mechanism B is pivotally connected to one end of a rod 27 the opposite end of which rod is pivotally connected to the lever intermediate the ends of such lever. From the foregoing it is apparent that when the shift bar is reciprocated, the racks 5 of the clutch mechanisms A and B are actuated in opposite directions longitudinally of the shaft 4, thereby causing joint transmission of power from the shaft 4 to the gears 14 of the respective clutch mechanisms. By reference to Fig. 1, when shift bar 23 is moved toward the right the forks 13 are moved away from one another thereby actuating the racks in opposite directions. The racks in turn expand the clutch shoes and cause the clutch shoes to bind upon the drums. When the shift bar is moved toward the left the forks are drawn toward one another whereby to release the clutch shoes from the drums. The link 25 serves only for effecting free and ready relative movement of the clutch actuating means without binding of lever arm 26 and shift bar 23. It is also apparent that if power is transmitted from the gears 14 to a common driven shaft 60 through the gears 61 mounted on the driven shaft 60, the clutch shoes will simultaneously bind and release their respective clutch drums.

The rack 9 is provided with a plurality of recesses 50 into which the lower end of a screw 51 carried by the collar 10 may lodge for adjustably fixing the collar upon the rack.

What I claim is:

1. In a clutch mechanism the combination of a drive shaft having slots extending longitudinally of itself, a rack mounted reciprocally in each slot, a clutch shoe mounted fixedly on the shaft adjacent each slot, gears carried by the shoes engaging the racks and adapted to be revolubly actuated by the reciprocation of the racks, drums with which the shoes may be brought into driving relation, means carried by the gears adapted to bind the shoes on the drums when the gears are revolved, and a lever connecting the racks for reciprocating the racks in the slots for simultaneously binding the shoes on the drums.

2. In a clutch mechanism the combination of a drive shaft having spaced slots, racks reciprocally mounted in the slots, collars reciprocally mounted on the shaft and each connected with a rack, forks mounted slidably and revolubly on the shaft rotatably engaging the collars, a lever connecting the forks whereby the forks may be reciprocated on the shaft, clutch shoes mounted fixedly upon the shaft adjacent each slot, drums with which the shoes may be brought into driving relation, gears revolubly mounted on each shoe, each gear engaging a rack, and means carried by the gears adapted to bring the shoes into driving relation with the drums when the gears are revolubly actuated.

3. In a clutch mechanism the combination of a drive shaft, a pair of friction clutches each having one clutch member secured to the drive shaft and the other clutch member freely and rotatably mounted on the drive shaft, the clutch members being adapted to be brought into driving engagement, individual means associated with each clutch for connecting the clutch members of the respective clutches, a lever pivotally mounted on one of the individual means, a rod pivotally mounted on the lever and on the other individual means providing floating compensatory adjustment of the said individual means, and means for actuating the lever for engaging the members of one clutch and simultaneously engaging the members of the other clutch through the agency of the rod.

4. In a clutch mechanism the combination with a drive shaft, a pair of friction clutches each having one clutch member secured to the drive shaft and the other clutch member freely and rotatably mounted on the drive shaft, the clutch members being adapted to be brought into driving engagement, individual means associated with each clutch for connecting the clutch members of the respective clutches, a lever pivotally mounted on one of the individual means, a rod pivotally mounted on the lever and on the other individual means, the actuation of the lever causing the engagement of the members of one clutch and the simultaneous engagement of the members of the other clutch through the agency of the rod.

5. In a clutch mechanism the combination of a drive shaft, a pair of clutches comprising a drive and a driven member, the driving member being secured to the drive shaft, and a floating means for simultaneously engaging the clutch members of each clutch comprising individual actuating means for each clutch, a lever pivotally mounted on one of the individual means, and a rod having one end pivotally mounted on the lever and the other end pivotally mounted on the other individual means, whereby the engagement of the members of one clutch will cause the simultaneous engagement of the members of the remaining clutch.

In testimony whereof, I have hereunto subscribed my name this 10th day of February, 1922.

WILLIAM G. KIRCHHOFF.